United States Patent
Commins

(10) Patent No.: US 7,037,060 B2
(45) Date of Patent: *May 2, 2006

(54) SHRINKAGE COMPENSATOR FOR BUILDING TIEDOWNS

(76) Inventor: Alfred Commins, 91 Douglas Rd., Friday Harbor, WA (US) 98250

(*) Notice: Subject to any disclaimer, the term of this patent is extended or adjusted under 35 U.S.C. 154(b) by 0 days.

This patent is subject to a terminal disclaimer.

(21) Appl. No.: 10/602,534

(22) Filed: Jun. 23, 2003

(65) Prior Publication Data

US 2005/0100428 A1 May 12, 2005

Related U.S. Application Data

(63) Continuation of application No. 10/146,531, filed on May 15, 2002, now Pat. No. 6,585,469.

(51) Int. Cl.
*F16B 43/00* (2006.01)

(52) U.S. Cl. .................. 411/536; 411/546; 52/293.3

(58) Field of Classification Search ........... 411/144, 411/535, 536, 534, 546; 52/293.3, 92.1–92.2; 74/89.42
See application file for complete search history.

(56) References Cited

U.S. PATENT DOCUMENTS

| 811,035 | A | * | 1/1906 | Childester | 411/535 |
|---|---|---|---|---|---|
| 1,746,978 | A | | 2/1930 | Winkler | 411/536 |
| 4,321,776 | A | | 3/1982 | Delight | 52/167 |
| RE31,713 | E | * | 10/1984 | Erikson et al. | 74/441 |
| 4,479,747 | A | | 10/1984 | Pagel | 411/8 |
| 4,708,555 | A | | 11/1987 | Terry | 411/149 |
| 4,812,096 | A | | 3/1989 | Peterson | 411/231 |
| 4,896,985 | A | | 1/1990 | Commins | 403/11 |
| 5,081,811 | A | | 1/1992 | Sasaki | 52/227 |
| 5,168,681 | A | | 12/1992 | Ayrapetyan | 52/223 L |
| 5,180,268 | A | | 1/1993 | Richardson | 411/536 |
| 5,340,258 | A | | 8/1994 | Simon | 411/535 |
| 5,364,214 | A | | 11/1994 | Fazekas | 411/536 |
| 5,522,688 | A | | 6/1996 | Reh | 411/536 |
| 5,535,561 | A | | 7/1996 | Schuyler | 52/223.13 |
| 5,540,530 | A | | 7/1996 | Fazekas | 411/339 |
| 5,815,999 | A | | 10/1998 | Williams | 52/223.13 |
| 5,839,321 | A | | 11/1998 | Siemons | 74/441 |
| 5,987,828 | A | | 11/1999 | Hardy | 52/295 |
| 6,007,286 | A | * | 12/1999 | Toyota et al. | 411/428 |
| 6,019,556 | A | | 2/2000 | Hess | 411/134 |
| 6,161,350 | A | | 12/2000 | Espinosa | 52/293.3 |
| 6,390,747 | B1 | * | 5/2002 | Commins | 411/536 |

(Continued)

OTHER PUBLICATIONS

Anchor Tiedown System Multi-Story Holdown Applications, Simpson Strong-Tie, 24 pages, Mar. 2002.

(Continued)

*Primary Examiner*—Flemming Saether
(74) *Attorney, Agent, or Firm*—Pate Pierce & Baird

(57) ABSTRACT

An automatic, self-energized, length extending, take-up unit for general use in wall hold down systems. The take-up unit is generally installed as a separate element, independent of threaded retaining elements of a hold down system. One embodiment includes an internal, preloaded, coil spring to rotate a threaded sliding member relative to a threaded base member, thereby to extend a height of the take-up unit. A trigger mechanism may be included to prevent unintended actuation of the unit. Additionally, a safety mechanism may be included to prevent inadvertent separation of a base member and a sliding member, thereby to prevent loss of a preload in an energizing spring.

15 Claims, 7 Drawing Sheets

U.S. PATENT DOCUMENTS

| | | | |
|---|---|---|---|
| 6,415,673 B1 * | 7/2002 | Erikson et al. | 74/89.42 |
| 6,494,654 B1 | 12/2002 | Espinosa | 411/353 |
| 6,585,469 B1 | 7/2003 | Commins | 411/536 |
| 2002/0066246 A1 | 6/2002 | Leek | 52/295 |

OTHER PUBLICATIONS

Zone Four Innovative Engineered Solutions, Zone Four, 24 pages, 2000.

* cited by examiner

SHRINKAGE COMPENSATOR FOR BUILDING TIEDOWNS

RELATED APPLICATIONS

This application is a continuation of U.S. patent application Ser. No. 10/146,531 filed on May 15, 2002 and now U.S. Pat. No. 6,585,469 entitled SHRINKAGE COMPENSATOR FOR BUILDING TIEDOWNS.

BACKGROUND

1. The Field of the Invention

This invention pertains to building construction, and, more particularly, to novel methods and apparatus for anchoring building walls to foundations and lower floors thereof. The invention provides an automatic adjusting mechanism to remove slack in a hold down system caused by wood shrinkage over time or wood crushing caused by earthquakes.

2. The Background Art

Wood products change dimensions as moisture content changes. Floor systems using solid sawn joists typically shrink approximately five percent in dimensions across the grain. Under certain conditions they have been known to shrink six and one-half percent within a year. This shrinkage is typically part of the overall process and condition called "settling." Settling actually includes both settling of foundations, as well as settling of walls due to shrinkage.

Testing and load rating has been completed for shear walls mounted to solid underlying surfaces. The solid surfaces are typically comprised of steel, concrete, or both. In tests wherein a wall is constructed, and immediately tested thereafter, test results are substantially better than those for walls that have existed over time. In a typical practice, a sill plate anchor or lower anchor is a threaded rod or an anchored strap capturing the base plate or sill plate of a wall (the bottom, horizontal member above which the studs extend vertically). Over time, ranging from several months to several years, wood loses moisture, shrinks, and the building settles. Threaded rod type anchors become loose. Strap type anchors buckle if positively engaged and become loaded in compression, or the like.

Current tiedown systems (including rods, straps, and the like) do not provide a solution for this problem. After a building "settles" the wall can lift before it will re-engage the hold down structure before the tiedown is even loaded to begin resisting movement of the wall. Substantial building damage can result before the anchoring hardware is loaded (in tension). Hardware that does not immediately engage the base of an anchored wall can result in a 50 percent to 70 percent loss in lateral, load-bearing capacity.

The problem arises, typically, in wind storms of great power, or in earthquake conditions. A building under such circumstances may be violently loaded or shaken back and forth in a lateral direction with respect to the extent of the wall. If a shearwall is tightly restrained by its base to a foundation, loads may be smoothly transferred from a horizontal to a vertical direction. Loads are resolved in the foundation, where they appear as tension and compression forces.

Buildings are often composed of long walls, (walls with a length greater than the height) and short walls (walls that have a length shorter than the height). The uplift load on a particular wall is inversely proportional to the length of the wall. Tall narrow shear walls (as commonly found in nearly all homes) act as lever arms and tend to magnify the input load. In certain instances and depending upon wall structural configuration, the actual load on the anchoring system may be magnified to several times the original load. Gaps caused by wood shrinkage may further introduce an undesirable shock load to the anchoring system as the gaps are closed and the anchor system is finally loaded.

However, the as-built building is generally not the building that will be sustaining loads induced by earthquake shaking or by wind. Wood components of the building structure, including floors, sill plates, top plates, and studs, will shrink. Shrinkage varies greatly but it ranges typically from about one-quarter inch under the best of conditions, to well over one inch.

Moreover, under load, wood crushes or collapses in compression under the loading of a wall. Neither shrinkage nor crushing are well-accommodated or otherwise resolved in currently available systems. These problems lead to a significant reduction in the lateral, load-bearing capacity of shearwalls. Typically, based on testing, load-bearing capacity reductions range from about 30 percent to about 70 percent, depending on whether the rating used corresponds to building codes for property preservation, or life safety.

A better hold down or tiedown system including an improved take-up is needed to accommodate shrinkage of building materials. An improved tiedown system with such an improved take-up mechanism will improve the strength of shear walls subject to shrinkage of constituent materials.

BRIEF SUMMARY AND OBJECTS OF THE INVENTION

In accordance with the above-identified needs, it is an objective to provide a self-powered take-up system for removing slack from between shearwalls and their anchors. It is an objective to provide a high reliability with a 30 year minimum life expectancy. It is desired that the apparatus be a non-reversing (locking in the extended position) design that may be shipped in a cocked, or preloaded position, ready to fire or deploy to extend in height, and having a trigger mechanism to actuate operation thereof. It is desirable to provide a simple mechanism that may be activated in the field with a minimum of skill and tools. In certain embodiments it is desirable to provide smooth and continuous motion of the take-up process, involving no stepped functions. Nevertheless, in other embodiments, step functions may be desirable. It is desired to minimize backlash to within thousandths of an inch.

It is desired to provide an apparatus that may be concentrically loaded, and thus able to tolerate and better center eccentric loads. In practice, few items are ever installed fully squared, and the take-up apparatus in accordance with the invention is preferably able to function at loads equal to the full tiedown design load for any anchor to which the take-up is attached. Ultimately, the tiedown should withstand the full ultimate load of a corresponding tiedown apparatus without jamming or deflecting substantially (e.g. more than one sixteenth of an inch).

In certain embodiments, the take-ups may be stackable to provide additional take-up capacity where more shrinkage, due to more buildup of wood, occurs. It is desired to provide standard sizes adapted to fit commonly used anchors and to fit within the space currently available for tiedown mechanisms. Thus, the take-up according to the instant invention may be sized for use with virtually any common size of tiedown system, or even for use in specially sized systems.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention may include an extender of monotonically increasing length (or height) fitted between an anchor and a wooden structure for taking up the space caused by wood shrinkage or crushing.

One embodiment of an apparatus according to the present invention includes a take-up unit having a hole therethrough to accommodate an anchor bolt of a hold down system. The take-up unit is generally structured to be interposed in compression between a surface to be retained and a retention nut carried in threaded engagement by the anchor bolt. A key functionality of a take-up unit is the capability of automatically increasing in height. Such increase in height may be accomplished in discrete steps, or as a continuous and smooth function.

A take-up unit typically includes a base member and a sliding member. The base and sliding members are generally cooperatively structured so that relative sliding motion between the base and sliding members causes a change in height of the take-up unit. The base and sliding members also typically have an interface therebetween adapted to retain the members in close sliding relation. One such interface might be a mutually engaged thread interface between the base and the sliding members. A second such sliding interface between a base and sliding member is a dovetail joint.

An exemplary take-up unit also typically includes a biased element configured as an expansion producing element. One practical and highly preferred expansion element is embodied as a coil spring, the spring being interposed between the base and sliding members and preloaded to urge the members toward a position of increased unit height. Also preferably included is a trigger mechanism operable to maintain the unit in an installation configuration having a first height. The trigger mechanism is generally releasable to deploy the unit for an automatic increase in height to a second height subsequent to installation of the unit in a hold down system.

A take-up unit according to the present invention may also include a safety mechanism which may be provided by an interference between structure carried by the sliding and base members. The safety mechanism may be engaged, or enabled, during manufacture of the take-up unit subsequent to preloading one or more springs. One function of a safety mechanism is to prevent unintentional disassembly of the unit. A safety mechanism may determine a maximum range of relative motion between base and sliding members. An exemplary safety mechanism is formed by a flange carried by the sliding member, the flange being deformed into position to interfere with structure carried by the base member subsequent to assembly of the unit. The interference created between the flange and base member structure prevents unintentional disassembly of the unit thereafter. A snap ring may also be employed to perform the same function as the flange.

A sliding member may also include a cover to form a debris-shield over an advancing interface between the members. The advancing interface may be defined as including at least a portion of that surface which produces an additional increase in unit height, the advancing interface being in addition to any surface in contact between the members while in an installation configuration. A take-up unit may be structured and arranged for stacking a plurality of units in-line in a hold down system to effect an increased range of total extension height.

A take-up unit may be fashioned to have a sliding member that includes a right-hand threaded hole for engagement with a commercial anchor bolt. The sliding member typically includes a bearing surface against which to receive a jam nut, the jam nut also being in engagement with the anchor bolt. To further prevent inadvertent rotation of the sliding member about the anchor bolt under the action of a preloaded spring, a thread having a different direction than the anchor bolt thread is preferably provided between the base and sliding members. To accommodate commercially available right hand threaded anchor bolts, a left-hand threaded engagement may preferably be provided as a slidable capture interface between sliding and base elements.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in 1 through 8B, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
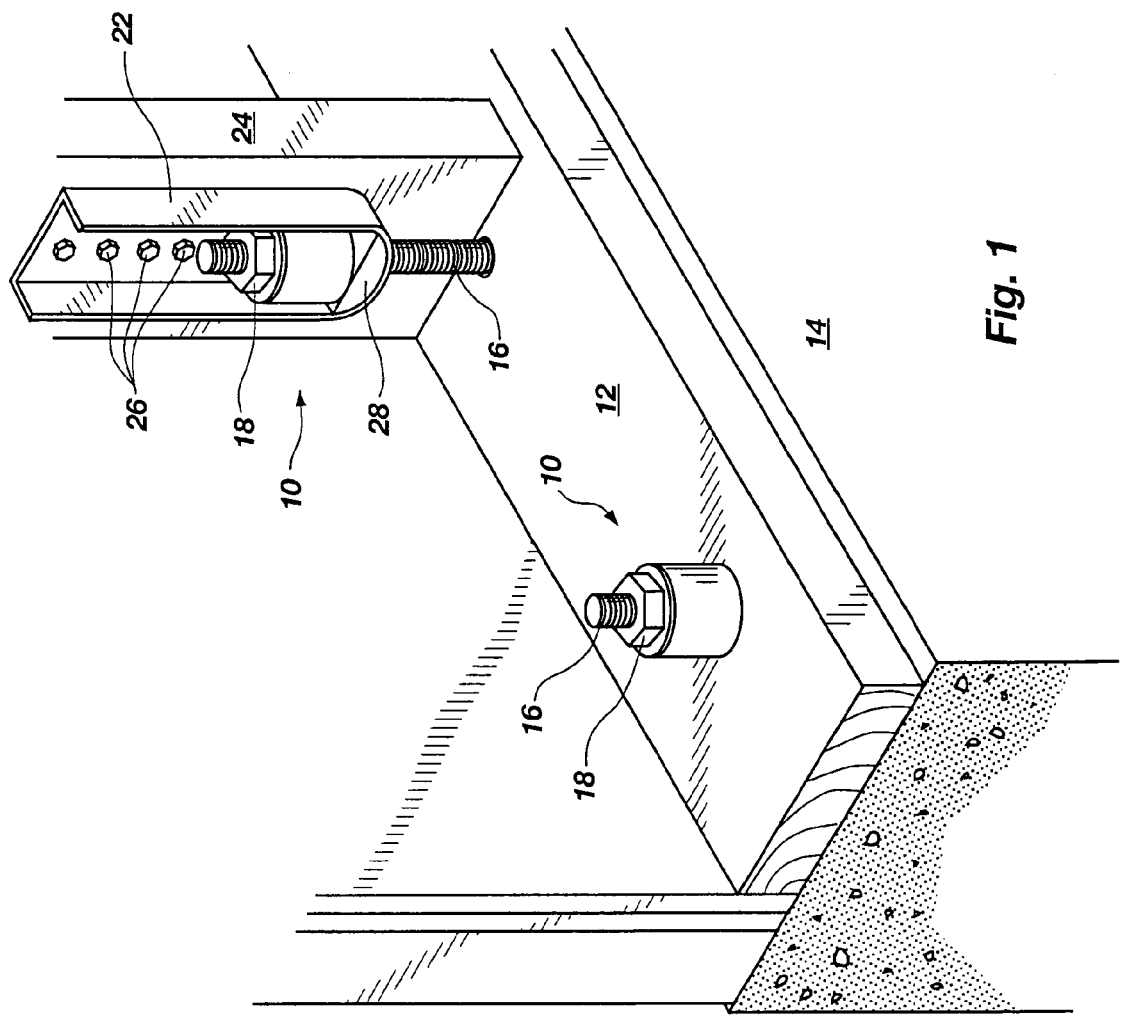
FIG. 1 is a perspective view in elevation of an apparatus providing automatic take-up in accordance with the present invention, depicted in two typical deployment arrangements illustrating take-up systems to accommodate shrinkage.

Referring to FIG. 1, a wood shear wall 8 is an engineered assembly of lumber, plywood (or OSB), nails and attachment hardware. Shear walls resist in-plane wind or seismic forces. Loads are transferred from the structure to the shear walls in-plane with the load. As a load is transferred into the wall, the wall will tend to move away from the load. The load therefore induces a rotation or moment in the wall. Wall rotation compresses one corner of the wall while the other corner tends to lift off from the foundation or support. Traditionally, the lower corners of the wall 8 have been held down by straps or hardware. However, as illustrated, the wall 8 may be retained by one or more take-up mechanisms 10, according to the invention, to accommodate structural shrinkage.

FIG. 1 illustrates two workable arrangements for securing an end of an anchor bolt 16. One arrangement simply bolts the sill plate 12 directly to the foundation 14, perhaps also including one or more washers between the retaining nut 18 and a sill plate 12. As illustrated, a take-up unit 10 is also included to compensate for any wood shrinkage. Depending on the loading of the take-up unit 10, a steel plate (not shown) may also be installed underneath the take-up unit 10 to spread out the compressive force of the take-up unit 10 against the sill plate 12. An alternate arrangement is to secure one end of an anchor bolt 16 incorporates a bracket 22. In this arrangement, the bracket 22 is secured to a stud 24 by multiple, spaced-apart fasteners 26. Again, a take-up unit 10 is included in position to compensate for wood shrinkage. A take-up unit 10 may be disposed between a retainer nut 18 and a metal spacer platform base 28 of the illustrated typical commercial retainer arrangement. The wood stud 24 facilitates load transfer into the sill plate by distributing load into the sill plate over the entire stud end.

The illustrated take-up units 10 in FIG. 1 are installed around, and oriented to take up slack in an axial direction of, the anchor bolts 16. The take-up units 10 may be considered to be restrained from radial motion by the anchor bolts 16. Preferred take-up units 10 are capable of extending to a full height, and maintaining such a full height, even in the event that the hold down system is subjected to excessive slack.

FIG. 1 illustrates a sill plate 12 installed directly on top of a foundation 14. This construction presents a minimum thickness of wood subject to shrinkage in the hold down system. An alternate standard method of constructing a building is called platform framing. This method includes building a floor platform on top of a double plated wall and then adding a wall on top of the floor. Since the anchor bolt 16 must then span a greater thickness of wood, a hold down to secure the wall on a floor of such construction is subject to considerable wood shrinkage. In another construction arrangement, a threaded rod 16 or an anchor bolt 16, attached to the foundation on one end, may pass through a sill plate 12, span the thickness of a joist, penetrate a subfloor and floor, and the bottom member of a stud wall 8. The aforementioned wooden members are generally oriented to present a maximum amount of shrinkage to the anchor bolt 16. A combined shrinkage of about three-quarters of an inch would not be atypical in such multilayer construction. Shrinkage as large as one-and-a-quarter inch may even be present.

Figure 2:
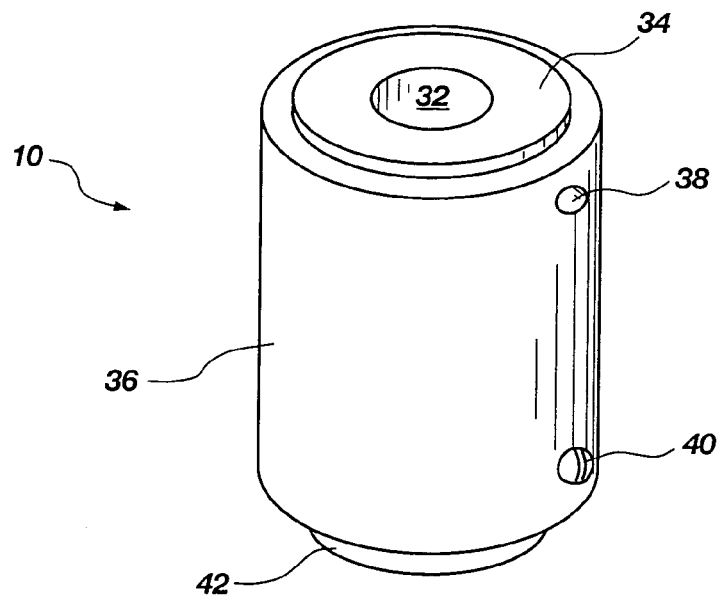
FIG. 2 is a perspective view from above of an apparatus shown in FIG. 1, in a contracted height configuration and with a safety trigger engaged.

A take-up unit 10 is illustrated in a fully collapsed, minimum installed height, arrangement in FIG. 2. A bolt hole 32 receives a tie down bolt 16 of a commercially available hold-down system. The bearing surface 34 is typically configured to receive a retainer nut and washer, if desired (not shown). A recommended retainer nut includes a self locking mechanism, such as a nylon collar. As an alternative, a thread locking compound may also be used between the anchor bolt 16 and a retaining nut 18. A pair of retainer nuts may also be used as jam nuts in binding opposition.

The illustrated sliding member 36 has a hollow shape, and carries a spring retaining fastener 38 and a deployment trigger 40. The sliding member 36 may be formed integrally, or made and assembled as separate components, such as separate cap and shell portions (not shown). The sliding member 36 carries internal structure to interface in sliding and extending relation with the base member 42. A trigger 40 may be fashioned as a pin or threaded fastener, or any other mechanism which performs as an adequate trigger. An exemplary trigger mechanism holds a unit in a pre-deployment, installation height until the unit is installed in a hold down system. Subsequent to such installation, the trigger is disengaged to allow automatic height extension of a unit. Such disengagement is preferably simple and may be accomplished in the field with a minimum of tools.

Figure 3:
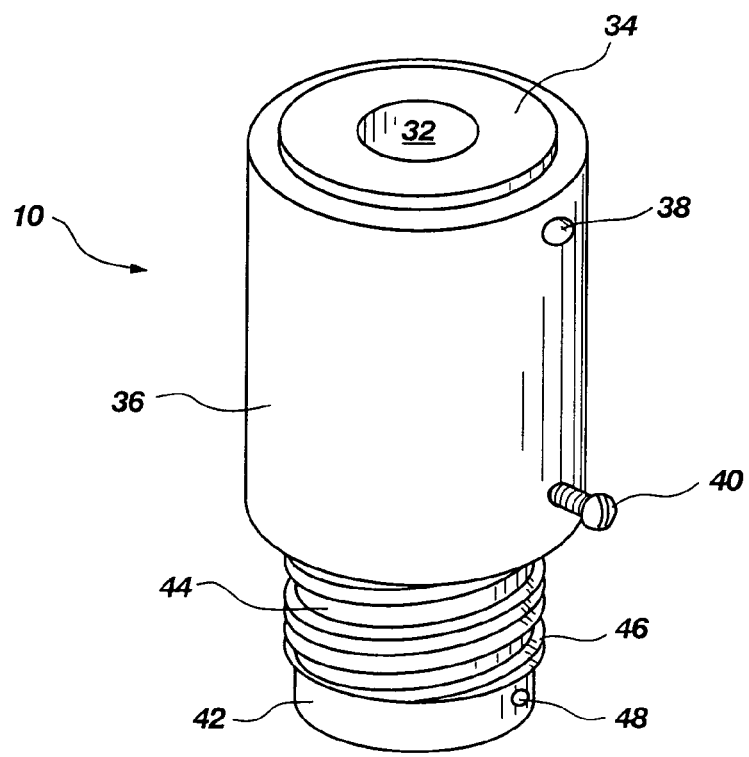
FIG. 3 is a perspective view in elevation of an apparatus of FIG. 1, in an expanded height configuration and with a safety trigger disengaged.

FIG. 3 illustrates a take-up unit 10 in an extended height configuration. A maximum extension height is determined, in part, by the strength of the material forming the sliding member 36, the base member 42, and the cross section of the interface structure therebetween. When the interface is fashioned as a thread, a sufficient amount of thread material must remain in engagement having a sufficient cross-section to carry the applied axial load. In addition, the load carried by a take-up unit may be applied eccentrically due to imperfections in the mounting structure or alignment of the anchor bolt.

Note also, in FIG. 3, that a deployment trigger mechanism 40 has been illustrated in an activated position. As illustrated, the trigger 40 is a threaded fastener. A fastener 40 may also serve as a motion limiting stop to prevent complete disassembly of a unit 10. To accomplish a motion limiting stop, a fastener 40 may be assembled in penetration through a sliding member 36 in such a way as to restrict the range of removal of a fastener 40. A portion of the fastener 40 would then remain in engagement with a gap 44 machined in the threads 46 carried by a base member 42. A sliding member 36 would be permitted to slide relative to a base member 42 only to the extent allowed by the fastener 40 in combination with a gap 44. Also visible in FIG. 3 is a socket 48, which receives the trigger mechanism 40 when a unit 10 is configured for installation height. A trigger 40, installed and seated in combination with a socket 48, prevents deployment of the unit 10 prior to installation in a hold down system.

The threads 46 are illustrated as being multi-start threads. Such a multiple-start thread configuration provides a larger change in height of a unit 10 for a given rotation of a sliding member 36 relative to a base member 42 than does a single-start thread configuration. Currently it is desirable to provide the members 36 and 42 having between a single-start thread and a four-start thread configuration. However, the number of thread starts may be increased to over eight, depending on the requirements of the application.

One trade-off to consider for a multi-start thread vs. a single-start thread is the tendency of a member 36 to slide backwards under load. In this context, "backwards" would be in the direction to decrease the height of a unit 10. A multi-start thread has a lesser resistance to sliding backwards, compared to a single-start thread of equivalent size, because the friction force generated between meshing threads is lessened by the increased contact angle possessed by a multi-start thread. The multi-start thread has an increased lead length, or travel per rotation, which is equivalent to a steeper ramp. The "ramp" formed by a thread increases in slope in a direct relationship with the number of thread starts.

Of course, the friction force between the members 36 and 42 can be increased by providing an interface surface having a higher coefficient of friction. One way to accomplish such an increase in friction would be to roughen the interface between mating thread surfaces. An alternative would be to create interlocking teeth on the threads, or mutually wavy threads. Such interlocking teeth would provide a discontinuous increase in height of a take-up unit under load.

Another alternative might incorporate a simple spring loaded ratchet device in the member 36 and a series of vertical steps machined across the member 42. In such an arrangement, the ratchet would engage the vertical steps, preventing "backward" movement. No Anti-Backing device or increased roughness surface treatment was needed in tests of the illustrated apparatus having a thread helix angle of about 5.5 degrees. The illustrated thread interface surface provides a smooth increase in height of a unit, where such height increase may be described as a continuous function of sliding displacement.

Figure 4:
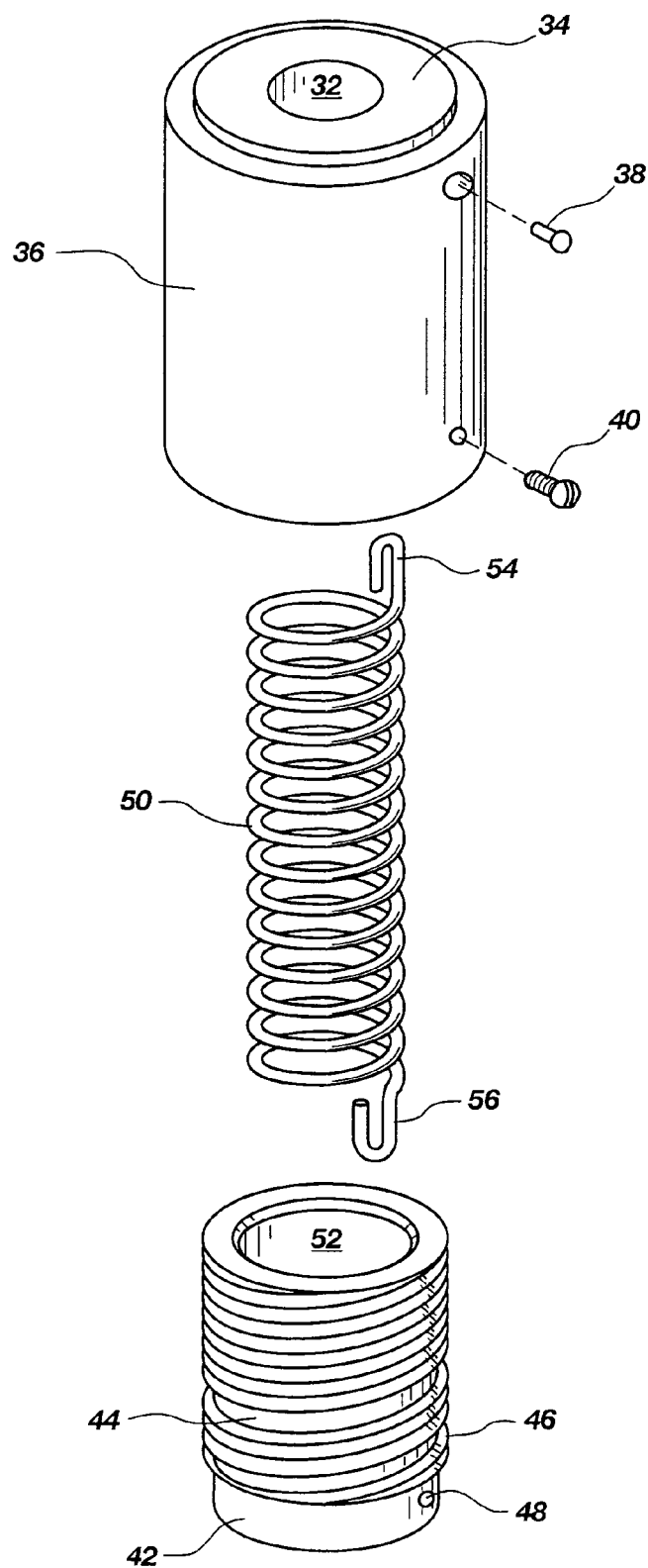
FIG. 4 is an exploded assembly view in perspective of an apparatus of FIG. 1.

FIG. 4 is an exploded assembly view in perspective of a representative take-up unit 10. A bias element, such as a coil spring 50, is received interior to a bore 52. The spring 50 provides a practical, self-energizing source to slide a sliding member 36 relative to a base member 42, thereby to extend a take-up unit 10 in height. Other biasing elements are within contemplation. Any other bias element capable of performing the desired function of urging a base member 42 and a sliding member 36 in a direction to effect an increase in height of a unit 10 would be acceptable.

The tab 54 of a spring 50 may be configured to serve as a retaining structure to aid in assembly of a unit 10. During assembly, the spring 50 is inserted into a member 36 where the tab 54 receives a fastener 38 in retaining engagement. The tab 56 is then received by a slotted structure within the base member 42 to secure the tab 56 relative to the base member 42. The spring 50 may be shaped to be substantially symmetrical, providing equivalent structure at both ends. Such symmetry may simplify manufacturing. A preload may be applied to the spring 50 prior to engaging the sliding member 36 with the threads 46. The tabs 54 and 56 may rotationally anchor the spring 50 to the sliding and base members 36 and 42 to provide torsional force acting to twist the sliding and base members 36 and 42 apart.

Still with reference to FIG. 4 and continuing the assembly procedure, a member 36 is then slid relative to a member 42 (by rotating one member relative to the other) until the trigger 40 may be engaged within the socket 48. Following these assembly steps, the tie-down unit 10 is armed, preloaded, and ready for installation in a wall hold-down fastening system.

After installing a unit 10 over an anchor bolt 16 (FIG. 1) and securing it with a retainer nut 18, the trigger 40 is released from engagement with the socket 48. The unit 10 is then ready to extend in length and automatically take up slack as the wood elements shrink. If the unit 10 is accidentally activated without being secured by a retainer nut, engagement of the structure of the partially withdrawn trigger 40 with the end of a slot 44 will prevent unintended disassembly of the unit. One reason to prevent such unwanted disassembly is to ensure that a proper preload will be maintained in the spring 50.

Preventing disassembly by engaging a safety mechanism after correct spring preload is established is a feature which may be included in practice of the instant invention. FIG. 4 also illustrates how a sliding element 36 may form a protective shield for the unexposed portion of threads carried by the base element 42, as well as the internal spring 50. The unexposed portion of threads may be regarded as an advancing interface. As the interface advances, an additional increase in take-up unit height is accomplished.

Figure 5:
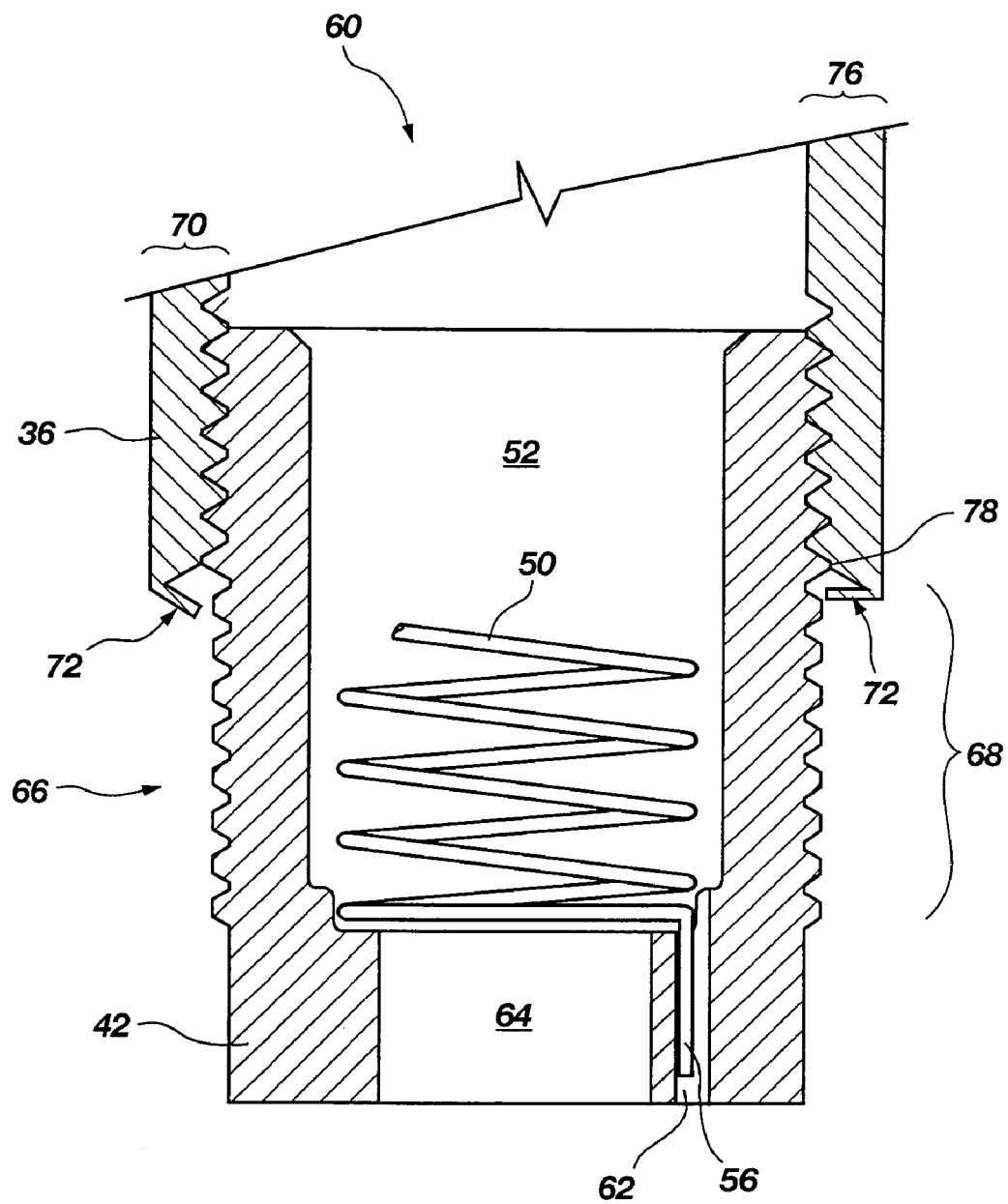
FIG. 5 is a cross-section view of an apparatus shown in FIG. 1, illustrating manufacturing details of one way to provide a positive restraint against disassembly.

FIG. 5 illustrates an alternative apparatus according to the present invention. A portion of an alternative take-up unit 60 is illustrated in a cross-sectional view in elevation. The spring end tab 56 may be embodied as a straight pin end received in a slot structure embodied as a hole 62. Again, a spring 50 (only a portion of which is shown in FIG. 5) may be symmetric for ease of manufacture. An anchor bolt slidingly passes through the illustrated hole 64, formed in a base member 42, upon assembly of a unit 60 in a hold-down system. The threads 66 may include a section of trimmed threads 68 wherein the tips of the trimmed threads have been removed to create a threaded section 68 having a reduced diameter.

A portion indicated by the bracket 70 of the sliding member 36 represents a sliding member 36 prior to assembly as a take-up unit 10. Prior to assembly, the end flange 72 protrudes at an angle and thereby clears all threads carried by the base member 42 during the assembly of a unit 60. The portion indicated by the bracket 76 of a sliding member 36 represents the configuration of a member 36 after the unit 60 is fully assembled and then substantially expanded in height. Note that the flange 72 has been deformed during the assembly procedure to be horizontal and in position to interfere with the thread tip 78.

During assembly of a unit 60, a sliding member 36 is threaded over a base member 42 until the flange 72 clears the threaded section 68. A flange 72 is then "canned" or deformed to lie substantially in a plane perpendicular to an axis of a take-up unit 60. The flange 72 has a reduced inner diameter subsequent to the canning operation. The reduced diameter is such that an interference is created with untrimmed thread tips such as the thread tip 78. The interference created between the flange 72 and the thread tip 78 is another way to provide a safety mechanism to prevent inadvertent disassembly of a take-up unit. In the alternative, the flange 72 may be replaced by a separate snap ring (not shown) that can be interference fitted or otherwise attached to the sliding member 36 during assembly. The snap ring would then interfere with untrimmed thread tips in the same fashion as the flange 72.

Figure 6:
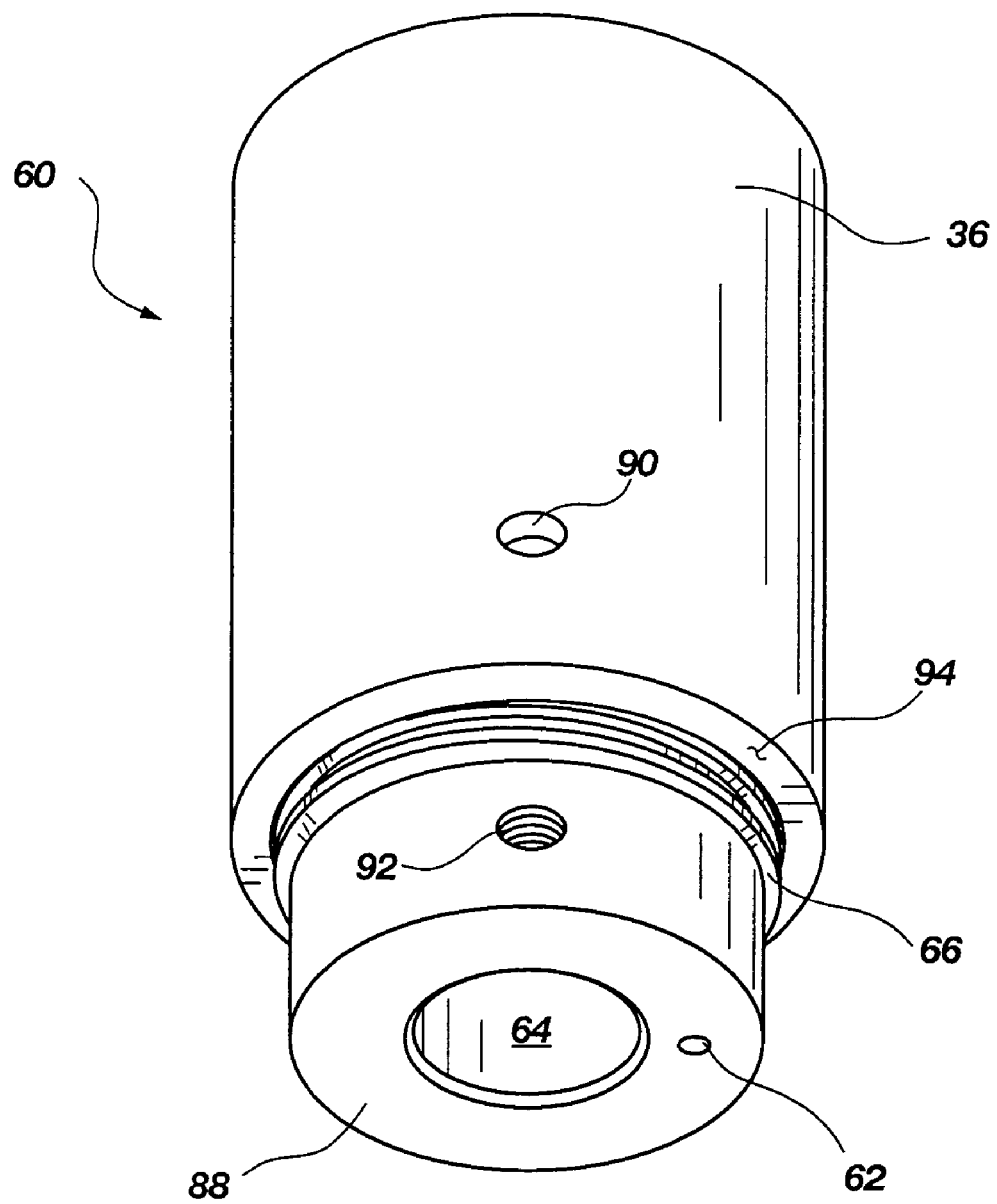
FIG. 6 is a perspective view from below of the apparatus of FIG. 5.

FIG. 6 illustrates a take-up unit 60 in a perspective view from below. The illustrated unit has been activated to provide automatic height adjustment, and is partially extended. The bottom bearing surface 88 has a through hole 62 to receive a tab 56 from an internal spring 50 (see FIG. 4). An alternate safety trigger mechanism is provided in the illustrated apparatus of FIG. 6. An oversize hole 90 slidingly receives a fastener or actuation trigger (not shown) for engagement with the receiving hole 92. In the alternative, the oversize hole 90 may have threads to engage the actuation trigger, and the receiving hole 92 may be made smooth to slidingly receive the trigger. With a fastener installed through the hole 90 and secured in the hole 92, the unit 60 is in a configuration ready for installation in a wall hold down system. The fastener or actuation trigger is removed after such installation to activate the automatic height adjusting capability of the unit 60. In this embodiment of a take-up unit 60, if the fastener or trigger were accidentally removed prior to installation, the flange 72 (seen in FIG. 6 as the surface 94) would prevent undesired separation of the members 36 and 42.

It is within contemplation for a flange 72 to have alternative configurations which accomplish the same purpose as a safety mechanism. One alternative configuration might include discontinuous flange sections around the circumference of a member 36, rather than forming one uninterrupted circular section, as illustrated in FIG. 6. Another configuration might include an alternative flange as a section that may be canned after final assembly to register into a discontinuous helical groove within a base member 42. Such a configuration combines aspects of the flange 72 of FIG. 5 and the trigger mechanism interface with the groove 44 of FIGS. 3 and 4.

Figure 7:
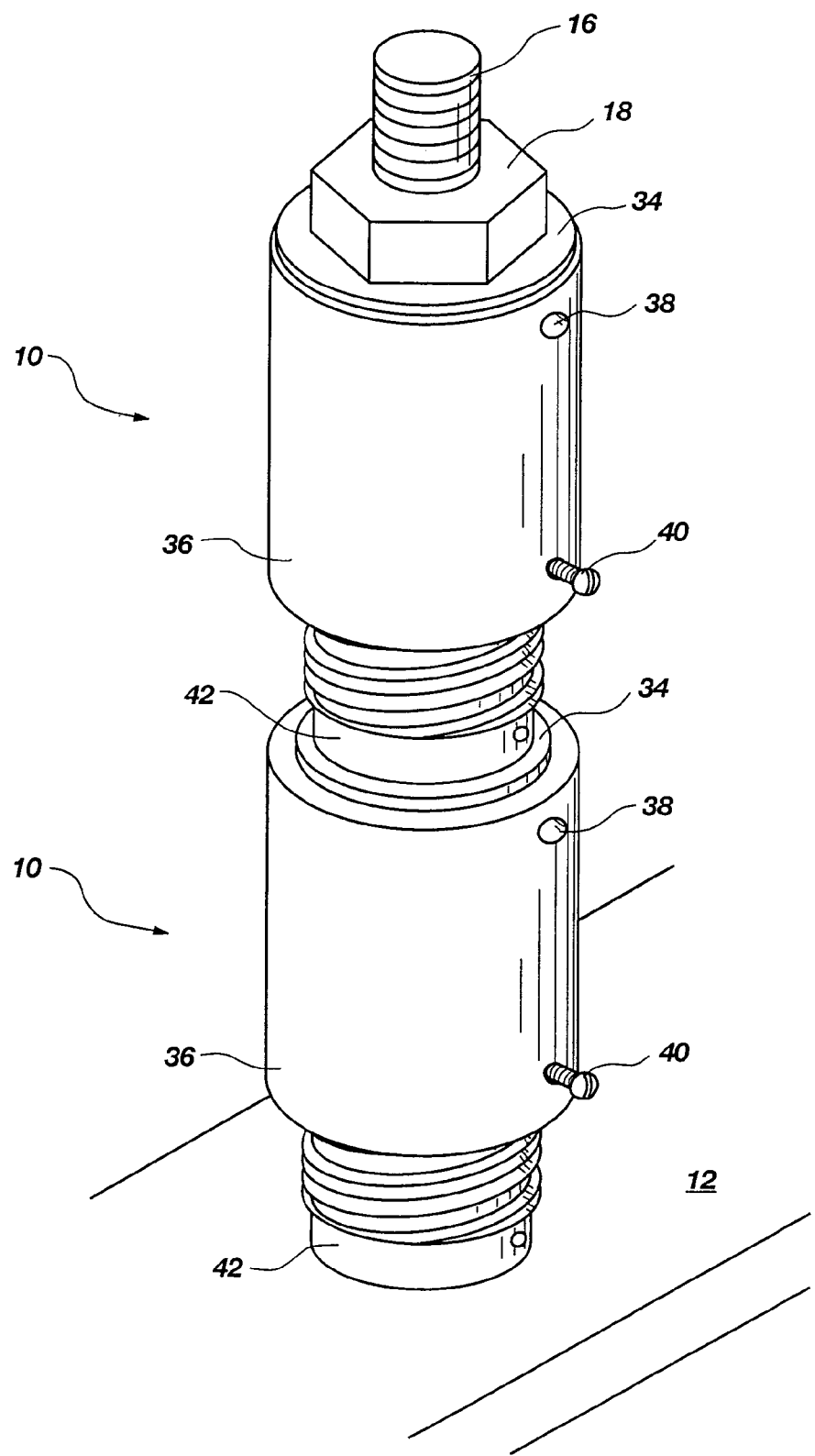
FIG. 7 is a perspective view in elevation illustrating two stacked apparatus of FIG. 1, being configured for increased range of adjustment.

In situations where expected wood shrinkage or crushing might exceed the capacity of a single take-up unit, two or more units may be stacked in combination, as illustrated in FIG. 7. Such an in-line configuration provides an additive height extension capability. One circumstance where such increased capability might be desired is in the construction of a log cabin. The situation might also arise in conventional construction using platform framing with joists having an extra depth, or in attaching an upper story wall to a "remote" foundation.

The embodiments of the take-up units 10 and 60 provide a measure of protection to the internal mechanism of the units. The illustrated sliding members 36 provide a cover over threads thereby protecting the interface surface which may be used for further increase in unit height. Upon assembly with a retainer nut over a hole 32, the sliding member 36 forms a substantial shield from debris and corrosive elements. Take-up units are typically pre-lubricated with a dry lubricant prior to assembly further to promote smooth actuation over a long life. A life span of perhaps 30 years or more is appropriate for take-up units that may be enclosed within finished walls.

Figures 8A, 8B:
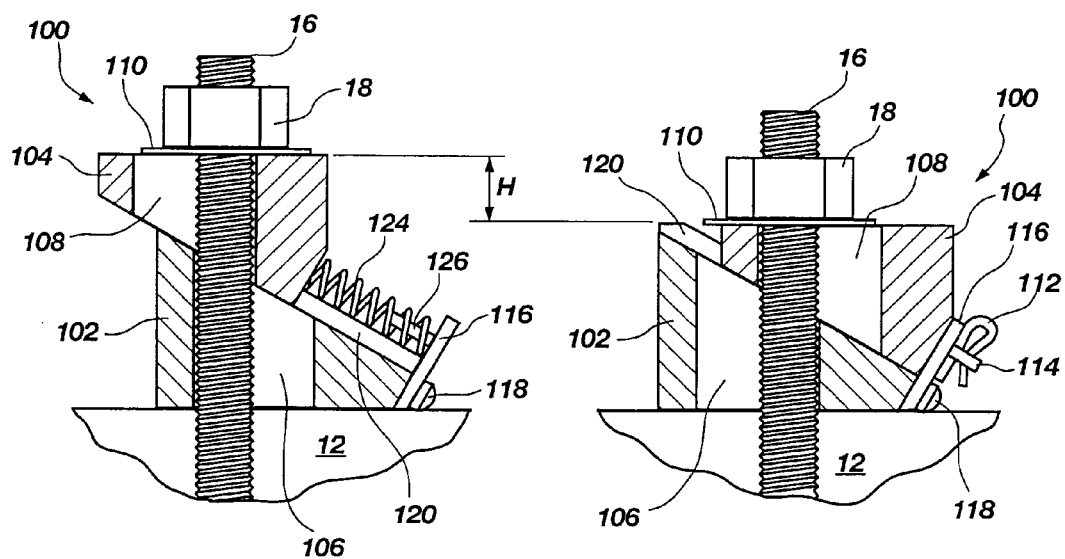
FIG. 8A is a cross-sectional view in elevation of a third take-up mechanism according to the present invention, illustrating a minimum installation height and a safety trigger mechanism.
FIG. 8B is a cross-sectional view in elevation of the apparatus of FIG. 8A, illustrating a maximum take-up height.

FIGS. 8A and 8B illustrate a third alternative embodiment of an apparatus in accordance with the invention, relying on translational movement between wedges, urged together using linear motion, instead of rotary motion. These Figures depict a sectional view in elevation taken through a midplane of the apparatus, and include an anchor bolt 16 for perspective. FIG. 8A illustrates the apparatus in a predeployment, minimum installed height, configuration. A ramp member 102 serves as a base and receives in sliding contact a complementary sliding ramp member 104. The slot 106 and the slot 108 are sized to receive an anchor bolt 16 and allow the ramp members 102 and 104 to slide relative to each other. In this embodiment, a washer 110 is typically included under a retaining nut 18.

Also illustrated in FIG. 8A is a deployment release trigger mechanism including a trigger 112 fashioned as a clevis pin. The release trigger 112 is received by one end of a retainer pin 114. The pin 114 is secured to a sliding member 104 on its opposite end. The trigger 112 through the pin 114 maintains a ramp member 102 in proximity to a thrust base 116, thereby preventing premature height extension of take-up unit 100. It is within contemplation to replace the pin 114 and the trigger 112 with a threaded fastener passing through a thrust base 116 and threading into the sliding member 104. An enlarged head section of such a fastener may be sized to not pass through the thrust base 116. Such an alternate trigger mechanism would simply be unscrewed from a sliding member 104 to deploy the take-up unit.

The thrust base 116 is illustrated as being structurally fixed to the base member 102 by one or more fasteners 118. The thrust base 116 may be secured to the base member 102 by any other appropriate fastening method, including without limitation, welding, interference fit, and adhesives. Furthermore, it is within contemplation also to machine an equivalent thrust base 116 directly from material forming the base member 102.

A sliding member 104 and a base member 102 are typically joined in a slidable capture arrangement, which prevents separation of the members in a height-increasing direction without a corresponding translation between base and sliding members. One arrangement to achieve such a result is illustrated as the dovetail joint structure 120 forming a dovetail joint between the members 102 and 104. Such a dovetail joint allows the members to slide relative each other in a height extending fashion, but prevents vertical separation of the members. In the case of an embodiment 100, a blind dovetail may be employed also to provide a safety mechanism to prevent a member 104 from sliding out of engagement with a member 102 in the event of inadvertent trigger release.

Many other configurations to accomplish a slidable capture feature are within contemplation. For instance, illustrated components, including a trigger 112, may serve as the capture feature, as well as a deployment release trigger mechanism. A thrust base 116, in combination with a pin 114 and a trigger 112 may provide sufficient restraint from member separation prior to installation of a unit 100 in a wall hold down system. Threads between the sliding and base members 36 and 42 of the first embodiment 10 (FIG. 4) also serve as such a slidable capture interface. Engaged threads prevent axial translation of separate members without also producing a corresponding sliding motion.

With continued reference to FIG. 8A, it is preferred that a guide structure of some sort be provided to prevent twisting of the base member 102 and sliding member 104 relative to each other. The illustrated dovetail joint structure 120 also provides such a guiding restraint. A simple box joint also would serve as a sufficient restraint. In a box joint configuration, the member 104 may be structured as a cap, having a slot in which a member 102 may slide. The converse configuration is also workable, wherein a base member 102 provides a slot in which a sliding member 104 may slide.

With reference to FIG. 8B, additional details, including the self-energized, height-extension capability of a take-up unit 100 may be seen. The arrangement illustrated in FIG. 8B represents a unit 100 configured for a maximum installed height. An anchor bolt 16 prevents the base and sliding members 102 and 104 from separating by sliding apart. The configurations of FIGS. 8A and 8B together demonstrate the maximum take-up height of which a single installed unit 100 is capable. Of course, two or more such units may be stacked end-to-end to achieve a greater take-up height.

Certain embodiments of a take-up unit 100 will have structure to prevent backwards movement of the sliding member 104 relative to the base member 102. As with the rotationally actuated take-up units 10 and 60, "backwards" means motion of a sliding member 104 and a base member 102 such that the overall height of the unit is reduced. In the case of a complement ramp structure, as illustrated in the unit 100, the ramp slope may be formed at such an angle that the frictional force generated between the ramp members 102 and 104 is adequate to prevent such undesired backwards travel. In certain situations, the interfacing surfaces between members may be formed to have indexing teeth, similar to steps or ratcheting gear teeth. Alternatively, a spring loaded pawl mechanism may be carried by one member to interface in structural interference with teeth or other structure including serrations carried by the other member.

In general, a unit 100 includes at least one, or a matched pair of, compression springs 124 to provide an automatic height extension force when deployed in a wall hold down system. The springs 124 each are received within a socket in the sliding member 102 (not shown) and are loaded in compression during assembly of a unit 100. A locating dowel 126 may aid in securing the free end of each spring 124 as the sliding member is placed into an assembled, deployment configuration. The preload created by the springs 124 is countered by a trigger mechanism, including the trigger 112 in combination with a pin 114 and the thrust base 116, prior to deployment of the unit.

Take-up units as illustrated and described may be manufactured from any suitable material, including ferrous and nonferrous metals. At times, stainless steels may be preferred in certain applications, particularly in corrosive or damp environments. Costs may be reduced in certain instances by the use of mild carbon steels. The strength of a take-up unit is generally designed to exceed the strength of other components of the hold down system, such as the anchor bolt.

A take-up unit 10, 60, such as embodiments illustrated, is typically installed as a separate element, independent of threaded retaining elements of a hold down system. However it is within contemplation also to provide a standard, right-hand, threaded hole 32 (FIG. 2) to interface with an anchor bolt 16. In such a configuration, a retainer nut may serve as a jam nut, fixing the element 36 from rotation relative to an anchor bolt 16. Such a configuration is presently considered less desirable because it removes one degree of rotational freedom from a take-up unit.

With a jam nut restraining the sliding member 36, only the base member 42 need rotate to extend a unit in height. While still workable, such a configuration may be less reliable than simply allowing both the base and sliding members 36 and 42 to rotate independently from the anchoring system. In the configuration having a threaded hole 32, it is often desirable to provide a left hand thread between the base and sliding members 36 and 42 to prevent rotating the sliding member 36 about an anchor bolt 16 under action of the self energizing spring 50. An apparatus having similarly directed threads in both the hole 32 and between sliding members may potentially and undesirably unscrew itself from the anchor bolt.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An expandable washer comprising:
    a base of generally cylindrical shape;
    a slide of generally cylindrical shape threadedly engaging the base to provide axial expansion of the washer during multiple revolutions of the slide with respect to the base in a first direction and axial contraction of the washer during multiple revolutions of the slide with respect to the base in a second direction, opposite the first direction, the base and slide providing a clearance hole extending axially therethrough; and
    a coil spring having a first end engaging the base and a second end engaging the slide, the coil spring contained completely within the base and slide and loaded in torsion to urge relative rotation of the slide with respect to the base in the first direction.

2. The washer of claim 1, wherein the coil spring is formed of stainless steel.

3. The washer of claim 2, wherein the slide threadedly engages the base with multi-start threads.

4. The washer of claim 3, further comprising a stop defining a maximum axial expansion to resist separation of the slide from the base.

5. The washer of claim 3, wherein the slide threadedly engages the base at a ramp angle of about five and a half degrees.

6. The washer of claim 5, wherein the stop imposes a structural interference between the slide and the base to resist further relative rotation once a selected axial expansion of the washer is achieved.

7. The washer of claim 6, wherein the stop comprises a snap ring applied to the slide to structurally interfere with the base once a selected axial expansion of the washer is achieved.

8. The washer of claim 6, further comprising a dry lubricant distributed along the threaded engagement between the base and slide.

9. The washer of claim 8, further comprising a selectively removable trigger resisting rotation of the slide with respect to the base.

10. The washer of claim 9, wherein the trigger comprises a removable screw extending radially through the slide to engage the base.

11. The washer of claim 1, wherein the slide threadedly engages the base with multi-start threads.

12. The washer of claim 1, wherein the slide threadedly engages the base at a ramp angle of about five and a half degrees.

13. The washer of claim 1, further comprising a stop imposing a structural interference between the slide and the base to resist further relative rotation once a selected axial expansion of the washer is achieved.

14. The washer of claim 1, further comprising a dry lubricant distributed along the threaded engagement between the base and slide.

15. The washer of claim 1, further comprising a trigger formed as a selectively removable screw extending radially through the slide to engage the base to resist rotation of the slide with respect to the base.

* * * * *

UNITED STATES PATENT AND TRADEMARK OFFICE
CERTIFICATE OF CORRECTION

PATENT NO. : 7,037,060 B2  Page 1 of 1
APPLICATION NO. : 10/602534
DATED : May 2, 2006
INVENTOR(S) : Alfred D. Commins It is certified that error appears in the above-identified patent and that said Letters Patent is hereby corrected as shown below:

At column 1, line 6, the recitation of priority should read --This application is a continuation of U.S. Patent Application Serial No. 10/146,531 filed on May 15, 2002, which is a continuation of U.S. Patent Application Serial No. 09/558,307 filed on April 25, 2000, which claims the benefit of U.S. Provisional Patent Application Serial No. 60/156,042 filed on September 24, 1999.--.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,037,060 B2 |
| APPLICATION NO. | : 10/602534 |
| DATED | : May 2, 2006 |
| INVENTOR(S) | : Alfred D. Commins |

It is certified that error appears in the above-identified patent and that said Letters Patent is hereby corrected as shown below:

At column 1, line 6, the recitation of priority should read --This application is a continuation of U.S. Patent Application Serial No. 10/146,531 filed on May 15, 2002, which is a continuation of U.S. Patent Application Serial No. 09/558,307 filed on April 25, 2000.--.

Signed and Sealed this

Twenty-ninth Day of April, 2008

JON W. DUDAS
*Director of the United States Patent and Trademark Office*